April 26, 1949. J. H. WILSON 2,468,388
COOLING SYSTEM FOR CLUTCH AND BRAKE DEVICES
Filed June 16, 1947 2 Sheets-Sheet 2
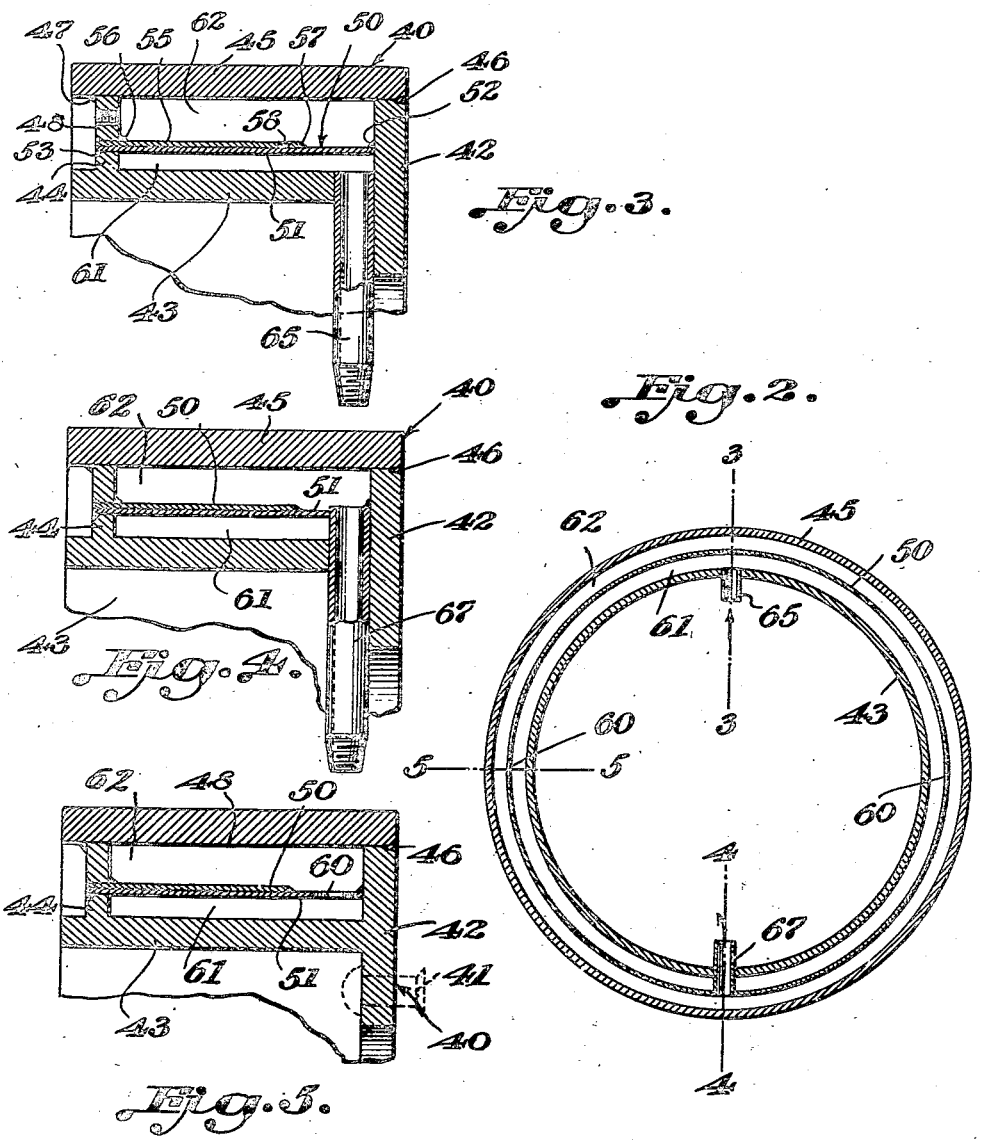

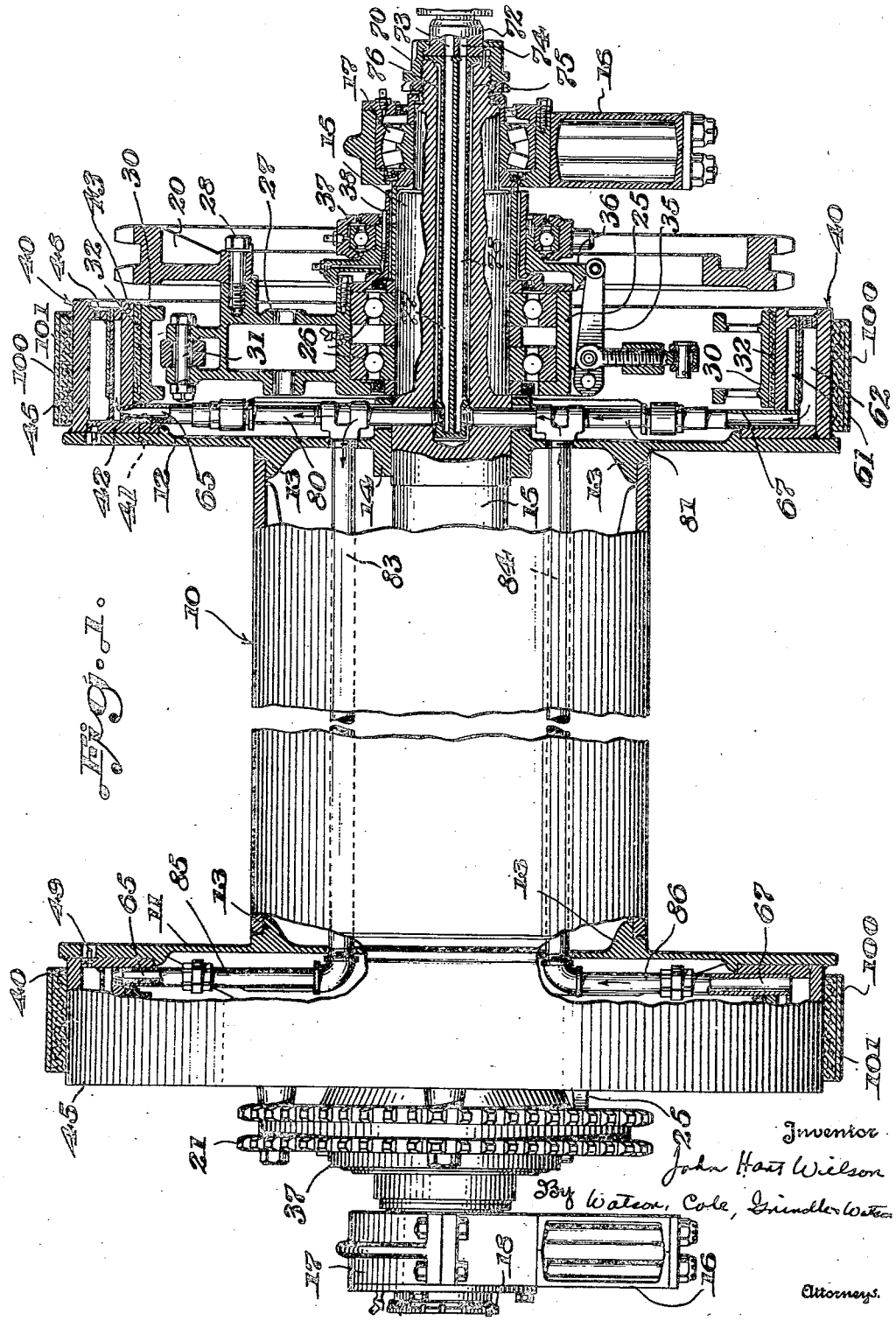

Patented Apr. 26, 1949

2,468,388

UNITED STATES PATENT OFFICE 2,468,388

COOLING SYSTEM FOR CLUTCH AND BRAKE DEVICES

John Hart Wilson, Wichita Falls, Tex.

Application June 16, 1947, Serial No. 754,816

12 Claims. (Cl. 192—12)

This invention relates to cooling systems and more particularly to means for extracting or dissipating heat from machine parts or the like, especially the deleterious and potentially dangerous heat which is developed in certain parts due to friction, as for example the considerable friction resulting from the application of brakes or friction clutches to rapidly rotating heavy machine elements. Certain practical applications of the invention suggest themselves in connection with the cooling of brake and clutch mechanisms in machines employed in the transmission of great forces or the handling of heavy loads, such as the machines commonly designated as "draw works" and used in the oil fields.

One example of the general class of cooling systems to which the invention relates is disclosed in my prior United States Patents 2,191,604 and 2,263,961, in which a splash system and a closed chamber circulatory system are both described in connection with the two brake rings applied to either end of a hoisting drum comprising part of a top drum assembly of a winch, spudder, or the like.

The present invention relates more particularly to the jacket or closed chamber type of brake and clutch ring cooling system, and has as its general object the provision of a novel and improved partitioned chamber embodied in a combined brake and clutch ring of a novel divided construction, the whole affording an improved assembly designed to maintain the effective operation of both the brake and the clutch regardless of the frictional heat developed by the application of the brake.

Other objects and features of novelty, including improved cooling liquid supply connections, will be apparent from the following specification when read in connection with the accompanying drawings in which one embodiment of the invention is illustrated by way of example.

In the drawings:

Figure 1 is a view partly in side elevation and partly in vertical axial section of a drum assembly embodying the principles of the invention;

Figure 2 is a somewhat diagrammatic view in vertical transverse section of the brake and clutch rings and the cooling chambers associated therewith; and Figures 3, 4, and 5 are fragmentary radial sections of the rings and intervening cooling chambers taken respectively on lines 3—3, 4—4, and 5—5 of Figure 2.

In the illustrated embodiment, the reference numeral 10 designates the cylindrical winding drum which may be of any type and adaptable for any purpose within the broad scope of the invention, but which is pictured by way of example as the winding drum of a draw works of a well drilling rig. The drum 10 is provided with the end plates or flanges 11 and 12 which are provided with the annular shoulders 13 adapted to receive the ends of the cylindrical drum proper.

As clearly indicated in the right-hand sectioned portion of Figure 1, the end plates 11 and 12 are provided with inner annular hubs or flanges 14 which are rigidly secured upon the drum shaft 15.

The shaft 15 is mounted for rotation upon the pedestals or supports 16 by means of the anti-friction bearings assemblies 17. It will be seen that the winding drum 10 is thus supported for rotation in either direction upon the supports, and at the left-hand end of the shaft 15 there is shown a coupling element 18 whereby the end of the shaft may be operatively connected through suitable clutching and coupling devices to a retarding brake device, preferably of the hydraulic type.

The drum 10 of the rig is adapted to be driven alternatively through the sprocket 20 at the right-hand end of the assembly or the smaller sprocket 21 to the left-hand end. Since these sprocket wheels are mounted and operatively connected to the drum by substantially identical means, only the assembly at the right-hand end will be described in detail. A clutch supporting and driving hub 25 is mounted for relative rotation upon the right-hand end of the shaft 15 through the intermediary of the bearings assembly 26, this hub having radial extensions 27 at intervals around its periphery upon which the sprocket wheel 20 is rigidly secured as by means of the bolts 28. One or more clutch shoes 30 are hingedly secured to portions of the rotatable member 25, 27, one of such hinged or pivotal connections being indicated at 31. The clutch shoes 30 are preferably provided with linings 32 of suitable friction material.

The clutch shoes 30 are expanded radially outwardly from the driving clutch member 25, 27 by conventional means which include the shoe actuating lever 35 which is moved by means of the bevelled ring 36 of the clutch shifter 37 which is splined at 38 to the shaft 15 and adapted to be actuated by the usual clutch shifting yoke.

At the outer peripheral margins of the end flanges 11 and 12 of the drum and extending outwardly from the exterior surface thereof are the combined brake and clutch ring assemblies designated generally by the reference character 40. These ring assemblies, as most clearly shown in Figures 3, 4, and 5 of the drawings, comprise an annular plate 42 which is bolted as at 41 or otherwise secured against the flanges 11 and 12. Preferably formed integraly with the annular plate 42 is the annular clutch ring 43, this ring being provided with a radially outwardly extending annular flange 44 which is parallel with the plane of the plate 42. Outwardly of the member 42, 43 there is disposed the brake ring 45 which is secured to the peripheral edge of the plate 42 as by the welding shown at 46. Adjacent the outer end of the inner surface of the brake ring 45 there is welded, as at 47, the inwardly directed annular flange 48, this latter flange being coplanar with the outwardly projecting integral flange 44 of the clutch ring 43.

It will be seen from the description thus far, that there is provided, between the ring 42, the clutch ring 43, the flanges 44 and 48, and the brake ring 45, an enclosed space within which may be provided a cooling liquid circulatory system. For this purpose, the internal space thus provided is subdivided by means of the comparatively thin annular partition 50 which comprises the plate 51 welded as at 52 to the outer surface of the plate 42 and as at 53 to the annular flange 44 of the clutch ring. Another plate 55 forms a part of the partition 50 and is of less width than the plate 51. The plate 55 is secured at one edge to the flange 48 of the brake ring as by means of the welds 56. The outer edge of the annular plate 55 is welded as at 57 to the outer surface of the annular plate 51. This latter welding may be reinforced by a series of spot weldings 58 slightly spaced from the peripheral weld 57.

Referring to Figures 2 and 5 of the drawings, it will be noted that at diametrically spaced points around the partition 50, the plate 51 is provided with openings 60 which afford communication between the inner clutch plate cooling jacket 61 and the outer brake ring cooling jacket 62. In order to introduce fluid into the cooling jackets or chambers, a nipple 65 is secured within an opening in the clutch ring 43 and against the annular plate 42. Similarly an outlet nipple 67 passes through an opening in the clutch plate 43, thence through the inner clutch ring cooling jacket 61 and through an opening in the plate 51 of the partition 50.

It will be noted that the inlet nipple 65 and the outlet nipple 67 are disposed 180° apart, and each at a 90° spacing from the jacket connecting openings 60. This is the preferred, though not a mandatory arrangement.

Applied to the outer surface of the brake ring 45 is the brake band 100, this band being actuated by suitable or conventional means common to all rigs of this character. The brake band 100 is provided internally with the brake lining 101. Similar bands are applied to the brake rings at both ends of the drum 10.

The means for supplying cooling liquid to the several cooling jackets of the brake and clutch assembly will now be described. Secured to the right-hand end of the shaft 15, as by means of the coupling 70, is a water-box assembly 72 which may be of any suitable construction and arrangement for providing separate inlet and outlet passages for the system. One end of such an inlet passageway is shown at 73 and a similar parallel outlet passageway is indicated at 74. Axially of the shaft 15 there is drilled a bore 75 within which is inserted a double conduit element 76. This element containing parallel inlet and outlet passageways 77 and 78 respectively which register respectively with the passageways 73 and 74 in the outer box 72. The outer walls of the passageways 77 and 78 are provided with threaded openings adjacent the inner end of the member 76 and pipe sections 80 serve to connect the inlet passage 77 with the inlet nipple 65 at the right-hand end of the drum and similar jointed pipe sections 81 connect the outlet passage 78 of the member 76 with the outlet nipple 67 at this end of the drum.

Intermediately of the lengths of the piping 80 and 81, there are provided the connecting pipes 83 and 84 which pass through the interior of the drum proper and are connected by means of the piping 85 and 86 to the nipples 65 and 67 of the cooling chambers at the left-hand end of the winch. The flow of fluid through the system is clearly indicated by the arrows.

By the provision of the divided chambers 61 and 62, one applied to the clutch ring 43 and the other to the brake ring 45, these rings are capable of moving, one independently of the other, under the expansive influence of the heat generated by brake application. In prior constructions, where a single cooling chamber is interposed between the brake and clutch rings and these rings are rigidly secured together, the inner or clutch ring is subject to being expanded outwardly away from its normal operative position with respect to the clutch shoes, when the brake ring expands. It will be noted that the cooling fluid enters the clutch cooling chamber or jacket portion 61 first and keeps the clutch ring relatively cool, and when the brake ring 45 moves radially outwardly when heated, it will be free to do so without appreciably disturbing the position of the clutch ring and the normal operating characteristics of the clutch mechanism.

The same normal condition of the clutch portions of the assembly is maintained at the inward sides thereof adjacent the drum flanges 11 and 12. Although the radially outer portions, including the brake ring 45 and the outer peripheral parts of the plate 42 are relatively free to expand under braking heat, the major inward portions of the plate 42, from the partition 50 on beyond the clutch ring 43, are of considerable mass, are subject to the greater cooling effect of the jacket portion 61, and are securely bolted or riveted to the metal of the drum flanges. Thus the clutch mechanism is effectively restrained from harmful expansion due to braking heat and the efficient operation of the clutch under all conditions assured.

Various changes and modifications may be made in the embodiment illustrated and described herein without departing from the scope of the invention as defined by the following claims.

Having thus described the invention, what is claimed as new and desired to be secured by Letters Patent is:

1. In a device of the class described, in combination, a shaft, a radial structure rigidly mounted on said shaft, a pair of concentric, overlapping, radially displaced, substantially cylindrical friction rings rigidly secured at corresponding edges to said structure and having free edges extending axially in the same direction from said structure, a pair of friction shoes one disposed adjacent the outer surface of the radially outer ring and the other disposed adjacent the inner surface of the radially inner ring, and adapted to be applied to said rings to control the rotation of said shaft, individual cooling jackets mounted respectively on the inner surface of the outer ring and the outer surface of the inner ring, means for supplying said jackets with cooling fluid, all whereby the device and the cooling system may not be damaged or rendered inoperative by expansion of the rings under braking heat.

2. In a device of the class described, in combination, a shaft, a radial structure rigidly mounted on said shaft, a pair of concentric overlapping, radially displaced, substantially cylindrical friction rings rigidly secured at corresponding edges to said structure and having free edges extending axially in the same direction from said structure, a pair of friction shoes one disposed adjacent the outer surface of the radially outer ring and the other disposed adjacent the inner surface of the radially inner ring, and adapted to be applied to said rings to control the rotation of said shaft, individual cooling jackets mounted respectively on the inner surface of the outer ring and the outer surface of the inner ring, means for supplying said jackets with cooling fluid, said means including an inlet nipple for one of said jackets, an outlet nipple for the other of said jackets, and communicating passageways between said jackets.

3. In a device of the class described, in combination, a shaft, a radial structure rigidly mounted on said shaft, a pair of concentric, overlapping, radially displaced, substantially cylindrical friction rings rigidly secured at corresponding edges to said structure and having free edges extending axially in the same direction from said structure, a pair of friction shoes one disposed adjacent the outer surface of the radially outer ring and the other disposed adjacent the inner surface of the radially inner ring, and adapted to be applied to said rings to control the rotation of said shaft, individual cooling jackets mounted respectively on the inner surface of the outer ring and the outer surface of the inner ring, means for supplying said jackets with cooling fluid, said means including an inlet nipple for one of said jackets, an outlet nipple for the other of said jackets, said nipples disposed 180° apart around the ring and jacket arrangement, and communicating passageways between said jackets, said passageways being also disposed 180° apart and each offset circumferentially by an angle of 90° from said nipples.

4. In a device of the class described, in combination, a shaft, a radial structure rigidly mounted on said shaft, a pair of concentric, overlapping, radially displaced, substantially cylindrical friction rings rigidly secured at corresponding edges to said structure and having free edges extending axially in the same direction from said structure, a pair of friction shoes one disposed adjacent the outer surface of the radially outer ring and the other disposed adjacent the inner surface of the radially inner ring, and adapted to be applied to said rings to control the rotation of said shaft, individual cooling jackets mounted respectively on the inner surface of the outer ring and the outer surface of the inner ring, means for supplying said jackets with cooling fluid, said means including an inlet nipple for one of said jackets, an outlet nipple for the other of said jackets, and communicating passageways between said jackets, said jackets having a common wall portion for a part of their widths and said communicating passageways comprising openings through said common wall portion.

5. In a device of the class described, in combination, a shaft, a radial structure rigidly mounted on said shaft, a pair of concentric, overlapping, radially displaced, substantially cylindrical friction rings rigidly secured at corresponding edges to said structure and having free edges extending axially in the same direction from said structure, a pair of friction shoes one disposed adjacent the outer surface of the radially outer ring and the other disposed adjacent the inner surface of the radially inner ring, and adapted to be applied to said rings to control the rotation of said shaft, an annular cooling chamber disposed between said rings and serving to apply cooling fluid to the opposite surfaces of the rings to those to which the shoes are applied, means for supplying cooling fluid to said chamber, said chamber being bifurcated, whereby upon limited relative expansion or contraction movement of said rings, the bifurcations of the chamber may follow the movements of their respective rings, and no rupture of the chamber occurs.

6. In a device of the class described, in combination, a shaft, a radial structure rigidly mounted on said shaft, a pair of concentric, overlapping, radially displaced, substantially cylindrical friction rings rigidly secured at corresponding edges to said structure and having free edges extending axially in the same direction from said structure, a pair of friction shoes one disposed adjacent the other surface of the radially outer ring and the other disposed adjacent the inner surface of the radially inner ring, and adapted to be applied to said rings to control the rotation of said shaft, radial end flanges at the free ends of the respective rings, said flanges being directed toward and approaching to close proximity with each other, a pair of parallel annular plates interposed between said rings and each having its outer edge secured to one of said end flanges, means securing said plates together throughout their annular extent along a line adjacent the supported edges of said rings at said radial structure, and both of said plates rigidly and continuously secured to said radial supporting structure.

7. In a device of the class described, in combination, a shaft, a radial structure rigidly mounted on said shaft, a pair of concentric, overlapping radially displaced, substantially cylindrical friction rings rigidly secured at corresponding edges to said structure and having free edges extending axially in the same direction from said structure, a pair of friction shoes one disposed adjacent the outer surface of the radially outer ring and the other disposed adjacent the inner surface of the radially inner ring, and adapted to be applied to said rings to control the rotation of said shaft, radial end flanges at the free ends of the respective rings, said flanges being directed toward and approaching to close proximity with each other, an annular plate disposed between said rings and approximately bisecting the space therebetween, the outer edge of said plate being peripherally connected with one of said end flanges and the inner edge of the plate secured along said radial structure, a second plate disposed parallel with and closely adjacent to said first named plate but of less width, means securing the outer edge of said second plate along the edge of the other of said end flanges, and means securing the inner edge of said plate along the surface of said first plate at a line spaced from the inner edge of said first plate, whereby a dual cooling chamber is provided for said two rings, comprising two jackets having a common inner wall portion between the radial structure and the line of junction between the two plates, and a double separable wall for the remainder of the width thereof.

8. The device set forth in claim 7 in which an inlet nipple extends from one of the jackets and an outlet nipple from the other, and there is provided an opening through the common wall portion providing intercommunication between said jackets.

9. The device as set forth in claim 7 in which a nipple extends radially outwardly through said inner ring to communicate with the inner jacket, another nipple extends through said inner ring and said common wall portion to connect with said outer jacket, and an opening is provided in said common wall portion for intercommunication between said jackets.

10. In a device of the class described, in combination, a shaft, means for supporting said shaft for rotation, a winding drum mounted upon said shaft and having a cylindrical reel portion and two circular end plates, at least one of said end plates being provided with an annular substantially cylindrical brake ring adjacent its outer periphery and an annular substantially cylindrical clutch ring concentric with said brake ring and spaced radially inwardly therefrom, a brake band adapted to be applied to the outer surface of said outer brake ring and a clutch shoe adapted to be applied to the inner surface of said inner clutch ring, individual cooling jackets applied to the opposite surfaces of said respective brake and clutch rings and disposed in the space between said rings, and means for supplying cooling fluid to said jackets.

11. In a device of the class described, in combination, a shaft, means for supporting said shaft for rotation, a winding drum mounted upon said shaft and having a cylindrical reel portion and two circular end plates, at least one of said end plates being provided with an annular substantially cylindrical brake ring adjacent its outer periphery and an annular substantially cylindrical clutch ring concentric with said brake ring and spaced radially inwardly therefrom, a brake band adapted to be applied to the outer surface of said outer brake ring and a clutch shoe adapted to be applied to the inner surfaces of said inner clutch ring, individual cooling jackets applied to the opposite surfaces of said respective brake and clutch rings and disposed in the space between said rings, and means for supplying cooling fluid to said jackets, said means comprising a water-box on one end of said shaft, a bore extending axially inwardly of said shaft from said end, a longitudinal partitioned conduit disposed in said bore and having its respective compartments connected with the water-box for the inlet and discharge of cooling fluid, radial conduits extending in diametrically opposite directions from said shaft, the inner ends thereof passing through radial openings in said shaft and connected with said compartments of said conduit, and the outer ends connected respectively with said cooling jackets to supply fluid to the one and remove it from the other, and intercommunicating means between said jackets at a point circumferentially spaced from said radial conduits.

12. In a device of the class described, in combination, a shaft, means for supporting said shaft for rotation, a winding drum mounted upon said shaft and having a cylindrical reel portion and two circular end plates, at least one of said end plates being provided with an annular substantially cylindrical brake ring adjacent its outer periphery and an annular substantially cylindrical clutch ring concentric with said brake ring and spaced radially inwardly therefrom, a brake band adapted to be applied to the outer surface of said outer brake ring and a clutch shoe adapted to be applied to the inner surface of said inner clutch ring, an inwardly directed radial flange on the outer edge of said brake ring and outwardly directed radial flange on the outer edge of said clutch ring, an annular partition plate having its inner edge welded to the end plate of the drum between said rings, and having its outer edge welded to one of said end flanges, a second partition plate parallel with and closely adjacent said first named partition plate and having its outer edge welded to the other of said end flanges, the second named partition plate being of less width than said first named plate and having its inner edge welded to an intermediate portion of said first named plate, the recited parts being so constructed and arranged as to provide a bifurcated cooling chamber between said rings, one compartment of which is carried by one ring and the other compartment by the other ring, at least one opening through the first named plate where it comprises the common partition wall between the compartments, and means for supplying cooling fluid to one compartment and removing it from the other.

JOHN HART WILSON.

REFERENCES CITED

The following references are of record in the file of this patent:

UNITED STATES PATENTS

| Number | Name | Date |
| --- | --- | --- |
| 2,159,250 | Brantly | May 23, 1939 |
| 2,263,961 | Wilson | Nov. 25, 1941 |
| 2,294,207 | Roberts | Aug. 25, 1942 |